United States Patent [19]

Colanzi et al.

[11] Patent Number: 4,571,227
[45] Date of Patent: Feb. 18, 1986

[54] BELT DRIVE UNIT FOR TRANSMITTING DRIVE BETWEEN THE DRIVE SHAFT ON AN INTERNAL COMBUSTION ENGINE AND ASSOCIATED ACCESSORIES

[75] Inventors: Franco Colanzi, Turin, Italy; Gordon Beton, Birmingham, Mich.

[73] Assignee: RIV-SKF Officine di Villar Perosa S.p.A., Turin, Italy

[21] Appl. No.: 696,759

[22] Filed: Jan. 31, 1985

[30] Foreign Application Priority Data

Feb. 1, 1984 [IT] Italy ............................. 52936/84[U]

[51] Int. Cl.⁴ ............................................. F16H 55/36
[52] U.S. Cl. .................................... 474/199; 474/169; 384/547
[58] Field of Search ...................... 474/199, 198, 169; 384/547

[56] References Cited

U.S. PATENT DOCUMENTS

| | | | |
|---|---|---|---|
| 1,975,296 | 10/1934 | Ross | 384/547 |
| 2,910,891 | 11/1959 | Heckethorn | 474/169 X |
| 3,798,987 | 3/1974 | Hurd et al. | 474/199 X |
| 4,084,397 | 4/1978 | McGrath | 474/199 X |

Primary Examiner—Stephen J. Novosad
Assistant Examiner—Thuy M. Bui
Attorney, Agent, or Firm—Michael N. Meller

[57] ABSTRACT

A belt drive unit for transmitting drive between the drive shaft on an engine and associated accessories is described, the said unit essentially comprising a pin, designed to fit on to one end of the said shaft, and a pair of pulleys having different diameters and turning round the said pin, a first smaller-diameter pulley being mounted on the said pin with a free-turning wheel inbetween, and the second pulley being mounted on the said pin with an electromagnetic coupling inbetween; the said pulley is provided with a first tubular element formed in one piece with the pulley itself and having a pair of races for two rings of ball bearings and a seat for the said free-turning wheel, provision being made for two rings of ball bearings designed to sustain rotation of the said tubular element in relation to the said pin.

4 Claims, 3 Drawing Figures

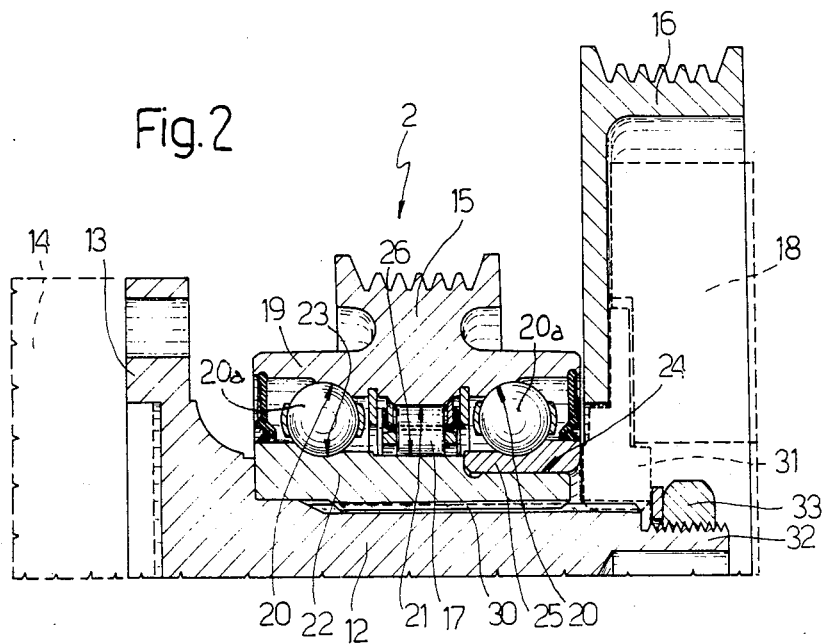
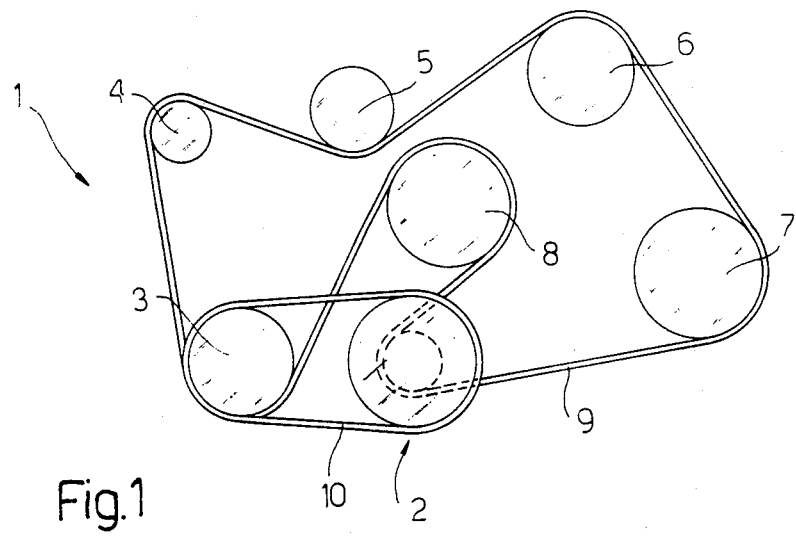

BELT DRIVE UNIT FOR TRANSMITTING DRIVE BETWEEN THE DRIVE SHAFT ON AN INTERNAL COMBUSTION ENGINE AND ASSOCIATED ACCESSORIES

BACKGROUND OF THE INVENTION

The present invention relates to a belt drive unit for transmitting drive between the drive shaft of an internal combusion engine and associated accessories. Drive units of the type covered by the present invention essentially comprise a pin, designed to fit on to one end of the said shaft, and a pair of pulleys having different diameters and turning round the said pin. The first smaller-diameter pulley is fitted on to the said pin with a free-turning wheel inbetween, whereas the second is fitted on to the same pin with an electromagnetic coupling inbetween.

Units of the type described are used for powering a drive belt connected to a number of pulleys, each designed to control an accessory on the engine, such as the alternator, water pump, conditioner, power steering and similar. The said drive unit provides for powering the said belt at two different speeds, high or low, depending on whether the drive shaft is running over or below a preset speed respectively.

Drive units of the type described usually comprise a coupling connected, e.g. by means of a splined connection, to the said pin and provided with a pair of seats for two rolling bearings. Such units are also provided with a second coupling, coaxial with the first and also having a pair of seats for the said bearings, which are mounted between the said two couplings so as to sustain rotation of the second in relation to the first. Between the said couplings, provision is also made for a free-turning wheel. The first pulley on the drive unit, usually made of sheet metal, is secured in any convenient manner, e.g. welded, to the second coupling.

The second pulley on the drive unit, also usually made of sheet metal, is supported in relation to the said pin by appropriate components forming part of the said electromagnetic coupling.

Drive units of the type described involve a number of drawbacks. Firstly, the numerous parts and components involved, e.g. the said two couplings and rolling bearings, result in a complex, cumbersome construction. Secondly, a number of the said parts involve strict machining tolerances and considerable care during assembly.

SUMMARY OF THE INVENTION

The aim of the present invention is to provide a drive unit of the type described, but involving none of the aforementioned drawbacks, i.e. one consisting of a small number of parts that can be produced easily and cheaply and enabling fast, easy assembly.

With this aim in view, the present invention relates to a belt drive unit for transmitting drive between the drive shaft on an engine and associated accessories, the said unit essentially comprising a pin, designed to fit on to one end of the said shaft, and a pair of pulleys having different diameters and turning round the said pin, a first smaller-diameter pulley being mounted on the said pin with a free-turning wheel inbetween, and the second pulley being mounted on the said pin with an electromagnetic coupling inbetween, characterised by the fact that the said pulley is provided with a first tubular element formed in one piece with the pulley itself and having a pair of races for two rings of ball bearings and a seat for the said free-turning wheel, provision being made for two rings of ball bearings designed to sustain rotation of the said tubular element in relation to the said pin.

BRIEF DESCRIPTION OF THE DRAWINGS

The invention will now be described, by way of a non-limiting example, with reference to the attached drawings in which:

FIG. 1 shows a drive arrangement fitted with the unit according to the present invention;

FIGS. 2 and 3 show longitudinal sections of two different arrangements of the unit according to the present invention.

DETAILED DESCRIPTION OF THE INVENTION

Figure 3:
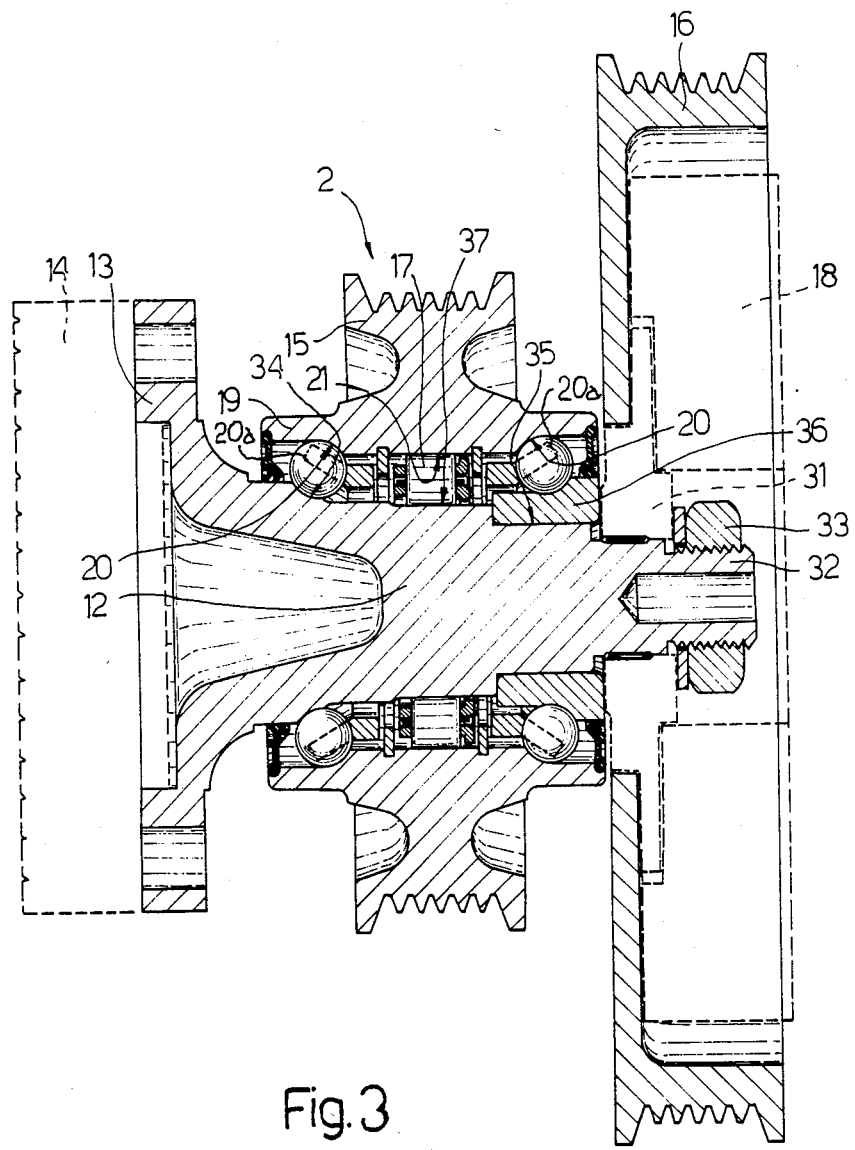

The drive unit according to the present invention is designed to be fitted on the drive shown schematically by 1 in FIG. 1. In addition to the drive unit according to the present invention, and numbered 2, the aforementioned drive comprises a number of pulleys, 3, 4, 5, 6, 7, 8, and a drive belt 9 which winds partly round the said pulleys and is powered by the unit itself. Belt 9 winds round the smaller-diameter pulley on unit 2, as shown schematically in FIG. 1, whereas a second drive belt 10 winds partly round the larger-diameter pulley on unit 2 and round pulley 3.

Each of pulleys 3 to 8 is designed to power one of the accessories on the engine, e.g. the alternator, water pump, conditioner, power steering or any other device on a vehicle controlled by the vehicle engine itself. In a first arrangement of the drive unit according to the present invention and shown in FIG. 2, provision is made for a pin 12 with a flange 13 designed to connect on to the end 14 of the drive shaft on the engine. The said unit also comprises a first pulley 15 (the smaller-diameter one shown in FIG. 1) and a second pulley 16 (the larger-diameter one shown in FIG. 1) having different diameters and turning round pin 12. The first pulley 15 is mounted on pin 12 with a free-turning wheel 17 inbetween, whereas the second pulley is mounted on the same pin with an electromagnetic coupling 18 (not shown) inbetween. As shown clearly in FIG. 2, the drive unit according to the present invention comprises a first tubular element 19, formed in one piece with pulley 15 and having a pair of races 20 and an essentially cylindrical seat 21 for free-turning wheel 17. The unit also comprises a second tubular element 22 connected to pin 12 and having a race 23 and a seat 24 for ball bearing inner ring 25. The said second annular element is also provided with a further cylindrical seat 26 for free-turning wheel 17.

Between tubular elements 19 and 22, provision is made for two rings of ball bearings 20a designed to roll in races 20 and 23 on tubular elements 19 and 22 and in the race of bearing ring 25.

As shown in FIG. 2, second tubular element 22 is conveniently connected to pin 12 by means of splined coupling 30. Pin 12 is also fitted with a ring 31, mounted on the pin by means of a splined coupling and locked in relation to the said pin by means of a threaded ring nut 33 screwed on to an end section 32 of the pin itself. As shown clearly in FIG. 2, the said threaded ring nut pushes ring 31 against bearing ring 25, thus locking the latter and second element 22 axially on to pin 12.

The drive unit in the second arrangement shown in FIG. 3 is essentially the same as the former, except that the second tubular element 22 has been dispensed with. In this case, race 23 (FIG. 2) for one of the rings of ball bearings and seat 24 for bearing inner ring 25 are formed directly on the outer surface of pin 12, as shown clearly in FIG. 3 in which they are numbered 34 and 35 respectively. In this case too, an inner bearing ring 36 forms the inner race of the ball bearings in the other ring 20a. The cylindrical seat 37 for free-turning wheel 17 is also formed on the outer surface of pin 12.

In this arrangement too, threaded ring nut 33, screwed on to end section 32 of pin 12, pushes ring 31 against bearing ring 36, thus locking the latter in relation to pin 12.

As shown clearly in the drawings, the races for rings of ball bearings 20a, formed on parts of the unit described, are shaped and mutually positioned in such a manner that the contact lines between the bearings and races lie on conical surfaces with their tips on opposite sides in relation to the said rings of ball bearings, i.e. the arrangement used for assembling angular ball bearings.

The drive unit described operates as follows: When drive belt 9 turns at a given first speed, electromagnetic coupling 18 is disconnected and the said belt is turned by pulley 15 on the unit, which turns at the same speed as pin 12 to which it is connected integral by free-turning wheel 17. In this first operating mode, pulley 3, which is also turned by drive belt 9, turns second pulley 16, via second drive belt 10, in the same direction as pulley 15. Consequently, pulley 16 turns freely in relation to pin 12, the said pulley 16 being supported by the said pin on account of electromagnetic coupling 18 inbetween.

When drive shaft 14 exceeds a given preset speed, electromagnetic coupling 18 is activated so as to turn pulley 16 at the same speed as pin 12.

With the coupling connected, the said pulley 16 tends to turn pulley 3 faster than the speed imparted by drive belt 9, with the result that the speed of the latter, in the said second operating mode, is increased. As soon as the speed of belt 9 exceeds the said first operating mode speed, the speed at which the said belt turns pulley 15 is higher than the speed pin 12 is turned at. The resulting relative movement between the pin and pulley 15 is such as to release free-turning wheel 17, so that the said pulley behaves essentially as if it were turning freely on the said pin.

Obviously, in the said second operating mode, pulleys 3, 4, 5, 6, 7 and 8 are turned faster than before, as required for controlling the accessories in accordance with the increased speed of the engine on the vehicle.

The described drive unit clearly consists of a small number of parts which do not require precision machining and which may be assembled easily and quickly. Furthermore, the resulting unit is highly compact as to structure and requires very little space. Lastly, pulley 15 can withstand very high radial loads caused by pull on the belt, thanks to the large-size ball bearings 20a employable on the unit.

To those skilled in the art it will be clear that changes may be made to the arrangements of the present invention herein described, both in terms of component design and layout, without, however, departing from the scope of the present invention.

We claim:

1. Belt drive unit for transmitting drive between the drive shaft on an engine and associated accessories, the said unit essentially comprising a pin, designed to fit on to one end of the said shaft, and a pair of pulleys having different diameters and turning round the said pin, a first smaller-diameter pulley being mounted on the said pin with a free-turning wheel inbetween, and the second pulley being mounted on the said pin with an electromagnetic coupling inbetween, characterised by the fact that the said pulley is provided with a first tubular element formed in one piece with the pulley itself and having a pair of races for two rings of ball bearings and a seat for the said free-turning wheel, provision being made for two rings of ball bearings designed to sustain rotation of the said tubular element in relation to the said pin.

2. Unit according to claim 1, characterised by the fact that it comprises a second tubular element located between the said pin and the said first tubular element, the said second tubular element having formed on it a race for one of the said rings of ball bearings, a seat for an inner bearing ring, having formed on it a race for the other ring of ball bearings, and a seat for the said free-turning wheel.

3. Unit according to claim 2, characterised by the fact that the said second tubular element is mounted on to the said pin by means of a splined connection.

4. Unit according to claim 1, characterised by the fact that the said pin has formed on it a race for one of the said rings of ball bearings, a seat for an inner bearing ring, having formed on it a race for the other ring of ball bearings, and a seat for the said free-turning wheel.

* * * * *